United States Patent [19]

Hyakutake

[11] Patent Number: 5,079,546
[45] Date of Patent: Jan. 7, 1992

[54] CHARACTER PROCESSING APPARATUS HAVING A DIGIT PLACE ALIGNMENT FUNCTION

[75] Inventor: Tatsuhiro Hyakutake, Nara, Japan

[73] Assignee: Sharp Kabushiki Kaisha, Osaka, Japan

[21] Appl. No.: 548,869

[22] Filed: Jul. 6, 1990

[30] Foreign Application Priority Data

Jul. 14, 1989 [JP] Japan .................. 1-183295

[51] Int. Cl.⁵ .......................... G09G 1/14; G06K 1/00
[52] U.S. Cl. ........................................ 340/750; 382/7; 395/148
[58] Field of Search ............... 382/7; 340/748, 750; 364/518, 521

[56] References Cited

U.S. PATENT DOCUMENTS 4,924,409 5/1990 Fukunaga ............ 364/518

OTHER PUBLICATIONS

Wordperfect: The Complete Reference, by Karen L. Acerson pp. 453–460.
Wordperfect Corporation, 1990, Version 5.1 pp. 491-692.

*Primary Examiner*—Leo H. Boudreau
*Attorney, Agent, or Firm*—Nixon & Vanderhye

[57] ABSTRACT

A character processing apparatus having a judgment device which checks if a tab setting has been made when a currency symbol is input from an input device, and a digit place alignment device which aligns an input numeral string preceded by the currency symbol around the position at which the tab setting has been made as a reference when it is judged that the tab setting has been made and outputs the numeral string to a display device, and which outputs the numeral string as it is to the display device without aligning the currency symbol and the numeral string when tab setting has not been made.

7 Claims, 3 Drawing Sheets

CHARACTER PROCESSING APPARATUS HAVING A DIGIT PLACE ALIGNMENT FUNCTION

BACKGROUND OF THE INVENTION

1. Field of the Invention

The present invention relates to a character processing apparatus and, in particular, to a character processing apparatus having a digit place alignment function to align and display an input numeral string.

2. Description or the Related Art

In a Japanese word processor which is a character processing apparatus, digit place alignment handling has been performed as in the following procedure. That is, first, the position of a numeral string to be aligned and input is specified by performing tab setting. When a numeral string is to be input, a digit place alignment key provided on a keyboard is pressed and as a result, a decimal point of the numeral string is aligned with a tab setting position as a reference and is input. In an English text word processor, a decimal tab key is pressed after tab setting and then a numeral string is input. Thus, the input numeral string is aligned around the decimal point in the same way as described above.

In the above-mentioned conventional word processor, however, since a special key for digit place alignment must be provided on a keyboard, such a word processor is complex in construction and expensive. During operation, an operator must press the special key (digit place alignment key or decimal tab key) for digit alignment prior to each time the operator aligns a numeral string and therefore a smooth input operation is hindered.

An arrangement is disclosed in Japanese Patent Laid-Open Publication No. 305454/1988, in which the number of digits after the decimal point are counted when numeric values and numeric values containing a decimal point are aligned at each tab position and input to find a maximum value, and vertical grid lines can be input automatically between the numeric values according to the maximum value determined.

SUMMARY OF THE INVENTION

The present invention is a character processing apparatus in which, when a numeral string containing a currency symbol is input, the apparatus is automatically switched to the digit place alignment mode so as to perform the digit place alignment of the numeral string. The character processing apparatus of the present invention comprises input means for inputting a numeral string containing a currency symbol and for specifying the position at which the numeral string is to be input on a screen, input position storage means for storing the position specified by the input means at which the numeral string is to be input, display means for displaying the currency symbol and/or the numeral string, storage means for storing a digit place alignment procedure, judgment means for judging whether or not the input position for the numeral string is stored in the input position storage means when the currency symbol is input form the input means, and digit place alignment means for aligning the numeral string in accordance with the digit place alignment procedure around the stored input position as a reference when it is judged that the input position for the numeral string is stored in the input position storage means and for outputting the aligned numeral string to the display means.

In the present invention, the currency symbol means a currency symbol consisting of one symbol such as $ and Y a currency symbol consisting of a plural character such as Fr and DM, or a currency symbol of a combination of these characters such as CAN$ and HK$. Digit place alignment is a process in which a numeral string is automatically aligned around a decimal point as a reference when it contains a decimal point and the last digit of the numeral at the rightmost character position when it does not contain a decimal point.

The fact has been noted that in table editing, during which numeric values are input in cells, an input numeral string is often preceded by a currency symbol, and thus the present invention is so designed that the currency symbol contains the digit place alignment function. It is desirable that an operator be able to select whether or not the currency symbol should be displayed on display means. The character processing apparatus of the present invention basically represents an apparatus consisting of input means, editing means, storage means, and display means. As typical apparatuses of this type, Japanese word processors, Western Alphabet word processors, Chinese word processors, and computers having a character editing function can be cited If apparatuses having a function equivalent to the tab setting function carried on apparatuses of this type, as the input position storage means, are to be included, portable electronic notebooks, computers having an information transfer function like a facsimile, and desk-top calculators with a programmable function can also be cited.

The digit place alignment process in the present invention is, in particular, useful for editing a table. Accordingly, it is preferable that the above-mentioned word processors or computers have the digit place alignment function of the present invention.

Also, in the arrangement in which a word processor or a computer has the digit place alignment function, if an input means can accept a currency symbol and a numeral string, then a keyboard and a pointing device, such as a tablet input device, a mouse, etc., may be used. However, a conventional keyboard having currency symbol keys and numeric keys should most preferably be used.

As the display means, a dot-matrix type display device connected or built in the above-mentioned apparatus such as a CRT, liquid crystal device (LCD), an electroluminescence (EL) display, or the like, may be used.

The input position storage means and the storage means can be formed by RAMs contained in the main body of a word processor or the like. A hard disk or a floppy disk as an external storage device can also be used. When a digit place alignment procedure (digit place alignment procedure program) is to be stored in the storage means, the digit place alignment procedure should merely be added without changing a Kana-Kanji conversion program. The program should be formed so that only when a numeral string containing a currency symbol is input, the operation will jump to the digit place alignment procedure process.

The judgment means and the digit place alignment means include a CPU, which at the present time operates in units of 8, 16, or 32 bits.

Further, according to the apparatus of the present invention, the judgment means judges whether or not the position at which a numeral string is to be input has been stored in the input position storage means when a currency symbol is input from the input means. When it is judged that it has been stored, the apparatus transfers the input numeral string, proceeded by the currency symbol, to the digit place alignment means. The digit place alignment means aligns the input currency symbol and the numeral string at the stored input position as a reference and displays it on the display means.

Therefore, according to the present invention, since the provision of a specialized key for digit place alignment is not needed, the cost of the apparatus can be lowered. In addition, when an apparatus in which the present invention is embodied is used, it is not necessary to press a digit place alignment key or a decimal tab key to switch to the digit place alignment mode each time a numeral string to be aligned is input, and ease of operation in the digit place alignment input is improved.

BRIEF DESCRIPTION OF THE DRAWINGS

An embodiment of the invention will now be described by way of example and with reference to the accompanying drawings, in which.

DESCRIPTION OF THE PREFERRED EMBODIMENT

Figure 1:
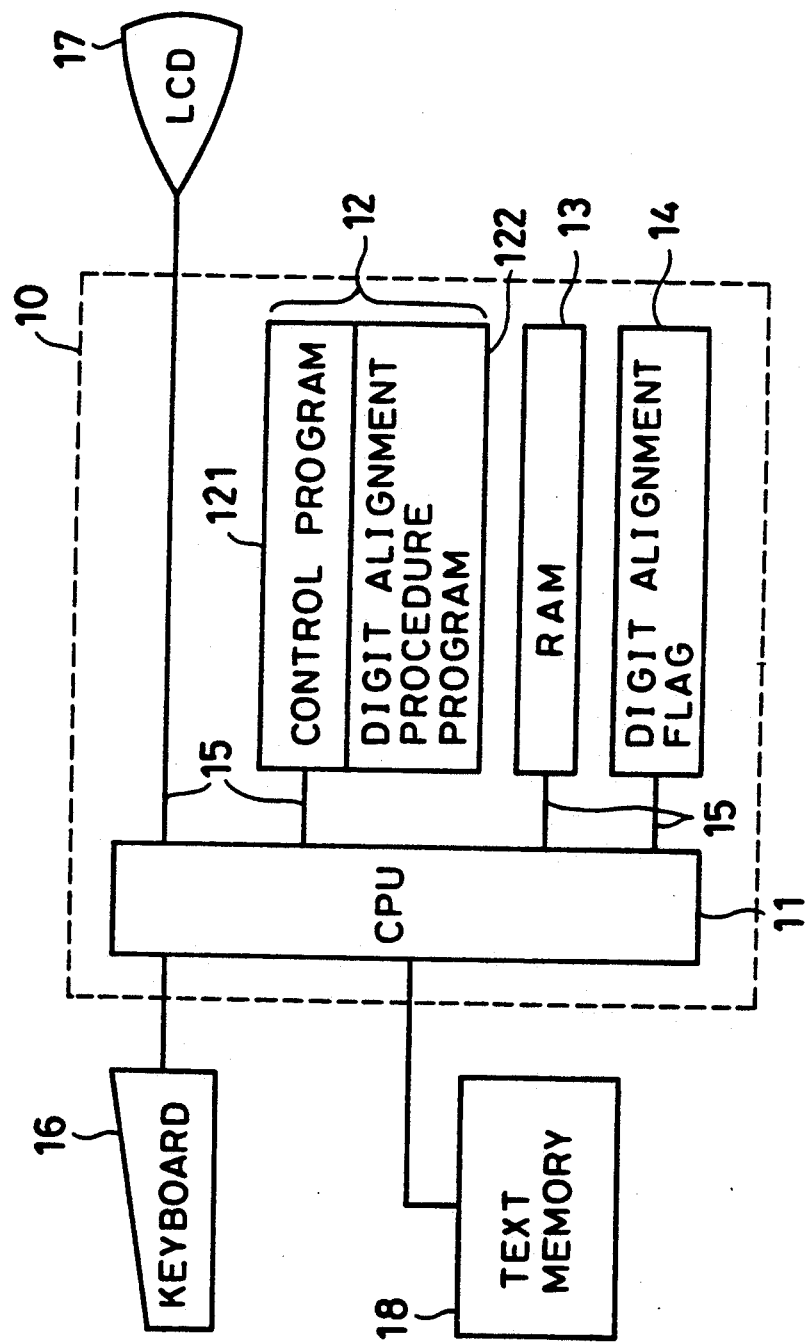
FIG. 1 is a block diagram illustrating the construction of a word processor according to an embodiment of the present invention.

In FIG. 1, numeral 10 denotes a Japanese word processor main body mainly consisting of a CPU 11, a ROM 12, a RAM 13, and a digit alignment flag 14, which are connected to each other by a bus line 15. The contents of the ROM 12 consists of a control program 121 for controlling the CPU 11 and a digit place alignment procedure program 122 A work area for temporarily storing the intermediate results during execution of a program is allocated to the RAM 13. Further, when tab setting is made on a screen, the tab setting position is stored in the RAM 13. The ROM 12 and the RAM 13 constitute the main memory. The digit place alignment flag 14 stores the presence or absence of the setting of the digit place alignment mode. The CPU 11 performs the following processes in accordance with the digit place alignment procedure program. That is, when a currency symbol is input from a keyboard (described later), it is judged whether or not the input position for a numeral string has been stored in the RAM 13, namely, the input position has been specified by the pressing of the tab key. When it is judged the input position for the numeral string has been stored in the RAM 13, the numeral string is aligned at the input position stored in the RAM 13 as a reference and is output to an LCD (described later) on the basis of the digit place alignment procedure program 122.

A keyboard 16 is connected to the CPU 11 from the outside. This keyboard 16 mainly contains currency symbol keys of "Y" and "$", character input keys, numeric keys, a tab setting key, cursor movement keys (not shown), etc. Characters and numeral strings containing currency symbols are input from the keyboard 16. The position at which characters and numeral strings are to be input is specified by the keyboard 16, that is, tab setting is made. An LCD 17 is externally connected to the CPU 11 via an output control section (not shown). This LCD 17 displays various kinds of information containing currency symbols and numeral strings input from the keyboard 16.

In addition, a text memory 18 composed of RAMs is connected to the CPU 11 as an auxiliary storage device. In this text memory 18 text containing numeral strings which have been definitely input is stored.

Figure 2:
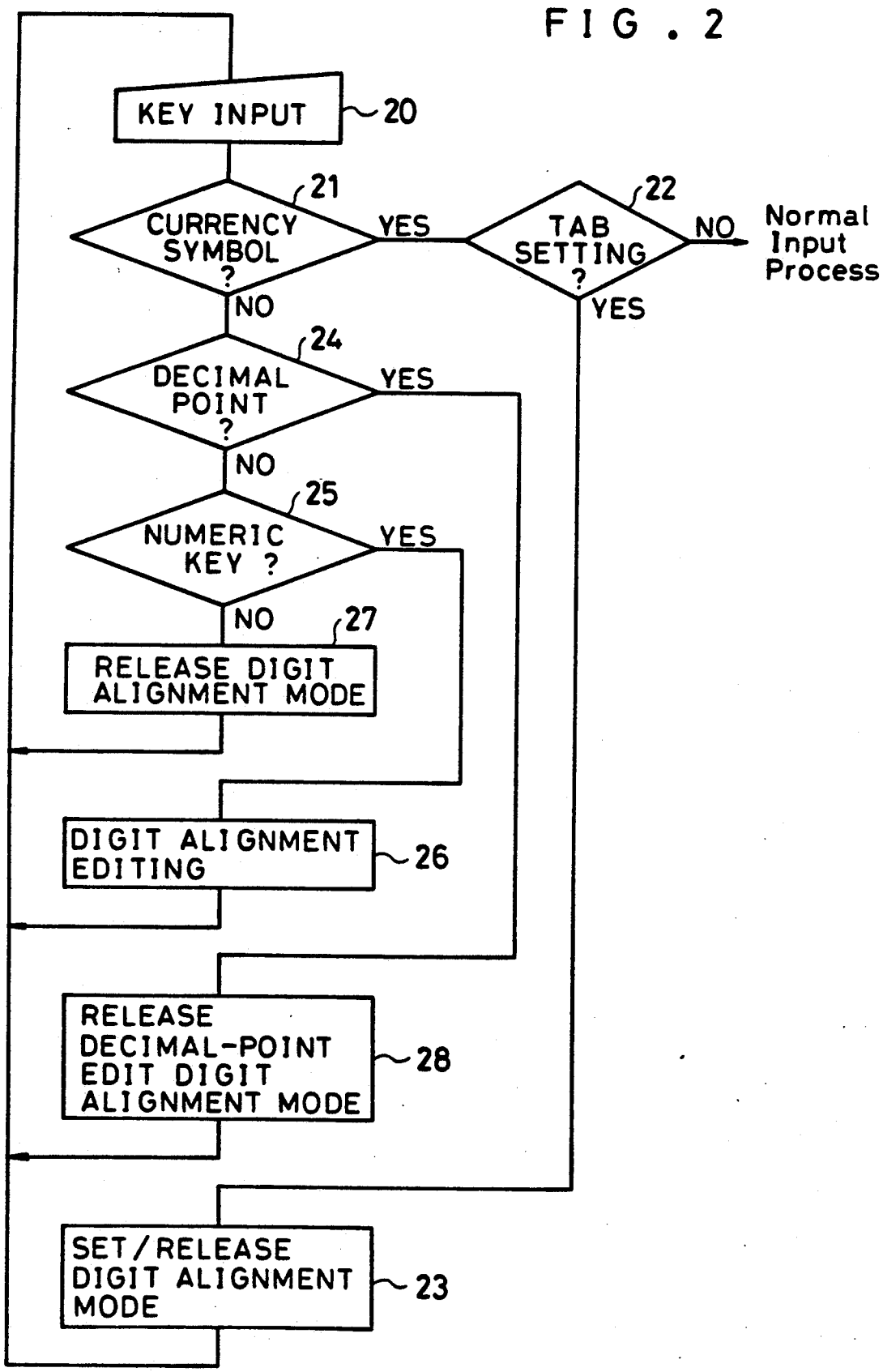
FIG. 2 is a flowchart for explaining the operation according to the embodiment.

Next, the operation of this embodiment will be explained with reference to the flowchart shown in FIG. 2 and the display example shown in FIG. 3. However, it is presupposed that the position at which a numeral string is to be input according to digit place alignment has been set beforehand on the screen by a conventional tab setting.

First, when the currency symbol "$" is input from the keyboard 16, the CPU 11 judges whether or not it is a currency symbol (steps 20 to 21), and further, whether or not a tab setting has been made (step 22). When the result of the judgment is yes, the digit place alignment mode is set and the digit alignment flag 14 is set to "on" (step 23). When a numeral string is input preceded by the currency symbol "$" (steps 24 to 25), it is right-justified at the input position set by the tab setting as a reference (step 26). When the inputting of the numeral string is terminated, the digit place alignment mode is released namely, the digit place alignment flag 14 is set to "off" (step 27). Where the numeral string preceded by the currency symbol contains, for example, a decimal point like "1234.5", it is judged to be yes in step 24 and decimal point editing is performed. That is, digit place alignment is performed in a state in which the input position at which tab setting has been made is fixed as the position of the decimal point Upon termination of the digit place alignment, the digit alignment mode is released. That is, the digit place alignment flag 14 is set to "off" (step 28). When a currency symbol is input a second time in a state in which the digit place alignment mode has been set in the digit place alignment flag 14, the setting of the digit place alignment mode is released (steps 22 to 23). In the case where tab setting has not been made in step 22, an entry will become a usual currency symbol input and a numeral string input for which digit place alignment is not performed.

Figure 3:
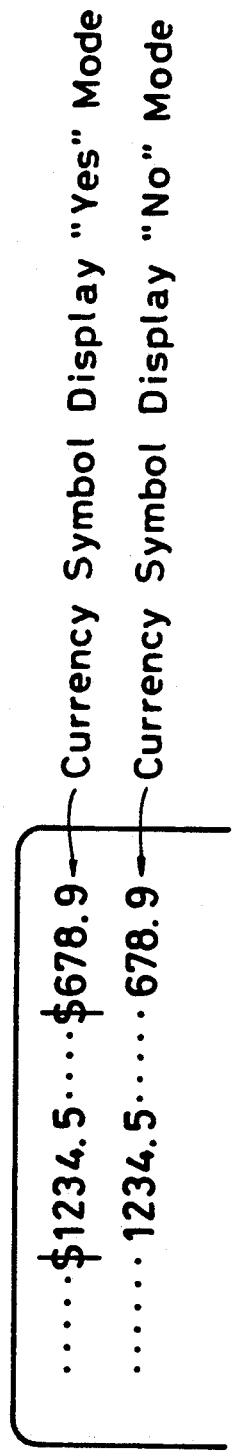
FIG. 3 is an explanatory view illustrating an example of a display for digit place alignment according to the embodiment.
Figure 4:
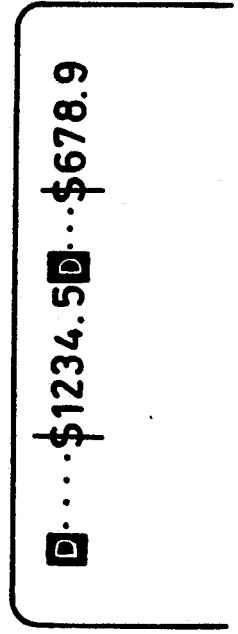
FIG. 4 is an explanatory view illustrating an example of a display for digit place alignment according to the prior art.

FIG. 3 shows a display example according to this embodiment. When the currency symbol display "yes" mode is selected, the currency symbol "$" and the numeral string are both displayed When the currency symbol display "no" mode is selected, only the numeral string is displayed. The selection of the currency symbol "yes" or "no" mode may be made at initialization time or at digit place alignment input time. FIG. 4 shows an example of a digit place alignment display according to the prior art, in which a decimal tab symbol "D" indicating the state switched to the digit place alignment mode appears on the screen, since the decimal tab key is always pressed before a numeral string is input.

This embodiment is explained using the currency symbol "$". However, the currency symbol is not limited to this currency symbol. It may contain similar types of currency symbols, for example, yen "Y", pound "£", similar types of currency symbols consisting of a plural character, for example, Franc "Fr", Deutsche Mark "DM", Krone "Kr", and currency symbols derived from these currency symbols, for example, Canada collar "CAN$" and Hong Kong dollar "KH$". Many widely different embodiments of the present invention can be made without departing from the spirit and scope thereof, therefore, it is to be understood that this invention is not limited to the specific embodiments thereof except as defined in the appended claims.

What is claimed is:

1. A character processing apparatus, comprising:
   input means for inputting a numeral string containing a currency symbol and for specifying the position at which the numeral string is to be input on a screen;
   input position storage means for storing the position at which the numeral string is to be input specified by said input means;
   display means for displaying the currency symbol and/or the numeral string;
   storage means for storing a digit place alignment procedure;
   judgement means for judging whether or not the position at which the numeral string is to be input has been stored in said input position storage means when the numeral string is input from said input means after the currency symbol; and
   digit place alignment means for aligning the numeral string containing the currency symbol in accordance with the digit place alignment procedure around the input position stored as a reference in the input position storage means when it is judged that the input position for the numeral string is stored in said input position storage means and for outputting the aligned numeral string to said display means, while alternatively outputting the numeral string containing the currency symbol to said display means in a state in which the numeral string is not aligned when it is judged that the input position for the numeral string is not stored in said input position storage means.

2. A character processing apparatus according to claim 1, wherein said currency symbol consists of one symbol such as $ and Y, a plural character such as Fr and DM, or a combination of these characters such as CAN$ and HK$.

3. A character processing apparatus according to claim 1, wherein said digit place alignment means includes a means which sets the digit place alignment flag ON for indicating that the digit place alignment process is selected when it is judged that the position at which the numeral string is to be input is stored in said input position storage means and which sets the digit place alignment flag OFF when inputting of the numeral string is terminated.

4. A character processing apparatus according to claim 1, wherein said input means includes a means for designating the display or undisplay of the currency symbol and a means for outputting the currency symbol and the numeral string to said display means after digit place alignment when said digit place alignment means is received with currency symbol display designation and for outputting only the numeral string after digit alignment when said digit alignment means is received with currency symbol undisplay designation.

5. A method for automatically aligning an input numeral string in a character processing apparatus having keyed character symbol and numeral sequences manually input to a computer controlled display, said method comprising the steps of:
   detecting occurrence of a keyed currency symbol and an existing tab setting and, and in response, turning a digit alignment mode setting ON;
   when the digit alignment mode setting is ON, detecting a subsequent keyed input numeral string and automatically aligning the display of such string with respect to said tab setting; and
   detecting the end of any such subsequent keyed input numeral string and, in response, turning said digit alignment mode setting OFF.

6. A method as in claim 5 further comprising:
   detecting an input keyed decimal symbol within a keyed input numeral sequence and, in response, forcing the digit alignment mode setting OFF if not already OFF.

7. A method as in claim 5 further comprising:
   displaying the keyed currency symbol which is also used, in conjunction with an existing tab setting, to turn the digit alignment mode setting ON.

* * * * *